United States Patent
Bui et al.

(10) Patent No.: US 9,774,261 B2
(45) Date of Patent: Sep. 26, 2017

(54) PROTOCOL FOR COMMUNICATION BETWEEN SECONDARY SIDE AND PRIMARY SIDE OF ISOLATED SWITCHING POWER CONVERTERS

(71) Applicant: DIALOG SEMICONDUCTOR INC., Campbell, CA (US)

(72) Inventors: Hien Huu Bui, San Jose, CA (US); Mengfei Liu, San Ramon, CA (US); Jianming Yao, Cupertino, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 15/026,937

(22) PCT Filed: Oct. 9, 2014

(86) PCT No.: PCT/US2014/059967
§ 371 (c)(1),
(2) Date: Apr. 1, 2016

(87) PCT Pub. No.: WO2015/054539
PCT Pub. Date: Apr. 16, 2015

(65) Prior Publication Data
US 2016/0294289 A1 Oct. 6, 2016

Related U.S. Application Data

(60) Provisional application No. 61/890,029, filed on Oct. 11, 2013.

(51) Int. Cl.
*H02M 3/24* (2006.01)
*G06F 1/26* (2006.01)
*H02M 3/335* (2006.01)

(52) U.S. Cl.
CPC .............. *H02M 3/24* (2013.01); *G06F 1/266* (2013.01); *H02M 3/33523* (2013.01)

(58) Field of Classification Search
CPC .......... H02M 3/24; H02M 3/28; H02M 3/335; H02M 3/33507; H02M 3/33515; H02M 3/33569; Y02B 70/126; Y02B 70/1433
(Continued)

(56) References Cited

U.S. PATENT DOCUMENTS

2008/0031286 A1 * 2/2008 Alfano .................... H01L 23/66
370/535
2009/0096519 A1 * 4/2009 El-Agha ................ H03D 3/006
329/300
(Continued)

OTHER PUBLICATIONS

PCT International Search Report and Written Opinion, PCT/US2014/059967, dated Jan. 22, 2015, 16 Pages.

*Primary Examiner* — Yemane Mehari
(74) *Attorney, Agent, or Firm* — Fenwick & West LLP (57) ABSTRACT

A power converter system comprises a switching power converter having a primary side and a secondary side that are electrically isolated from each other. A first controller on the primary side of the switching power converter controls a switch in the switching power converter on or off at a switching frequency of the switching power converter to regulate an output voltage of the switching power converter. A second controller on the secondary side of the switching power converter encodes information into one or more pulses such that a first duration between the consecutive pulses corresponds to a first logic level and a second duration between the consecutive pulses corresponds to a second logic level, the second duration being greater than the first duration.

20 Claims, 8 Drawing Sheets

(58) Field of Classification Search
USPC ............................... 363/15–20, 21.01–21.18
See application file for complete search history.

(56) References Cited

U.S. PATENT DOCUMENTS

| | | | | |
|---|---|---|---|---|
| 2010/0254443 | A1* | 10/2010 | Scharrer | H02M 3/33515 375/220 |
| 2011/0038184 | A1* | 2/2011 | Sutardja | H02M 3/335 363/21.17 |
| 2011/0292694 | A1* | 12/2011 | Ye | H02M 3/33507 363/21.18 |
| 2012/0176823 | A1* | 7/2012 | Sims | H02M 7/02 363/69 |

* cited by examiner

PROTOCOL FOR COMMUNICATION BETWEEN SECONDARY SIDE AND PRIMARY SIDE OF ISOLATED SWITCHING POWER CONVERTERS

BACKGROUND

This disclosure relates generally to switching power converters, and in particular to communicating information received at a secondary side of a switching power converter to a primary side of the switching power converter.

Isolated switching power converters such as flyback and forward power converters may employ primary side sensing schemes to indirectly sense and regulate voltage output by the converter. The output voltage is sensed on a primary side of power converter at each switching cycle of the switching power converter. Such isolated switching power converters may employ pulse width modulation to regulate the output voltage under full, heavy load conditions. Under low- or no-load conditions, pulse frequency modulation may be used to regulate the output voltage, with the switching frequency being lowered as the load decreases.

As the switching frequency is lowered, it may become difficult for the isolated switching power converter employing primary side sensing of the output voltage to react to sudden changes in the load such as reconnecting an electronic device to the output of the switching power converter. Since load conditions are sensed at each switching pulse of the converter, the low switching frequency of the switching power converter under low- or no-load conditions may be too low for the converter to react to sudden changes in the load.

Furthermore, some isolated switching power converters are designed to work with a plurality of output voltages (e.g., 5V, 12V, etc.) as required by the electronic device connected to it. Such isolated switching power converters would receive a command signal from the connected electronic device indicating the output voltage required by the connected electronic device. The electronic device may also send other command signals relating to other requirements of the electronic device. Since the electronic device is connected to the switching power converter at the output of the power converter (that is, on a secondary side), such command signals are received on the secondary side of the switching power converter.

SUMMARY

Embodiments herein provide a power converter system including an isolated switching power converter having a primary side and a secondary side that are electrically isolated from each other. A first controller on the primary side of the switching power converter controls a switch in the switching power converter to regulate an output voltage of the switching power converter. A second controller on the secondary side of the switching power converter encodes information into one or more pulses such that a first duration between the consecutive pulses corresponds to a first logic level and a second duration between the consecutive pulses corresponds to a second logic level, where the second duration is greater than the first duration. For example, in one embodiment, the first duration and the second duration are times between rising edges of two consecutive pulses generated by the second controller. In another embodiment, the first duration and the second duration are times between falling edges of two consecutive pulses. A communication channel is used to transmit the encoded information from the second controller to the first controller while maintaining electrical isolation between the primary side and the secondary side of the switching power converter.

Accordingly, the power converter system according to various embodiments precisely communicates information from the secondary side of the switching power converter, enabling the switching power converter to provide multiple target output voltage levels in response to requests from electronic devices coupled to the switching power converter, compensate for out-of-specification output voltage levels, and respond to other information received at the secondary side of the switching power converter.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Embodiments herein include an isolated switching power converter employing a primary side controller residing on the primary side of the isolated switching power converter for sensing and regulating the output voltage, as well as an AVP (adaptive voltage position) controller residing on the secondary side of the isolated switching power converter configured to communicate a variety of information sensed at the secondary side of the switching power converter to the primary side controller. Such information may include information on the load conditions and changes thereof, commands or information provided by the electronic device connected to the isolated switching power converter, etc.

The AVP controller encodes such information or command received at the secondary side of the switching power converter to digital logic bits of ones and zeros, which are then sent to the primary side controller over a digital communication link in the form of pulses, where the different period of each pulse corresponds to a one or zero of the digital logic bits. For example, a longer pulse may indicate zero, and a shorter pulse may indicate one. Different commands may be encoded in one data frame with a combination of such pulses with different periods, where a period is defined as the duration of time between two rising (or falling) edges of consecutive pulses. A plurality of such long or short pulses are sent by the secondary side AVP to the primary side controller to communicate such information or commands received at the secondary side of the switching power converter. Such pulses are sent through a communication link that may include isolation devices that electrically isolate the primary side from the secondary side of the switching power converter, such as an opto-coupler, a digital isolator, a capacitor, etc. The pulse periods will not be affected significantly by the different characteristics of such isolation devices.

Embodiments described herein provide for precise transmission of information from the secondary side of the switching power converter to the primary side, a higher error and variation tolerance than analog implementations, and a built-in parity check to detect errors in data packets transmitted from the secondary side to the primary side.

Figure 1:
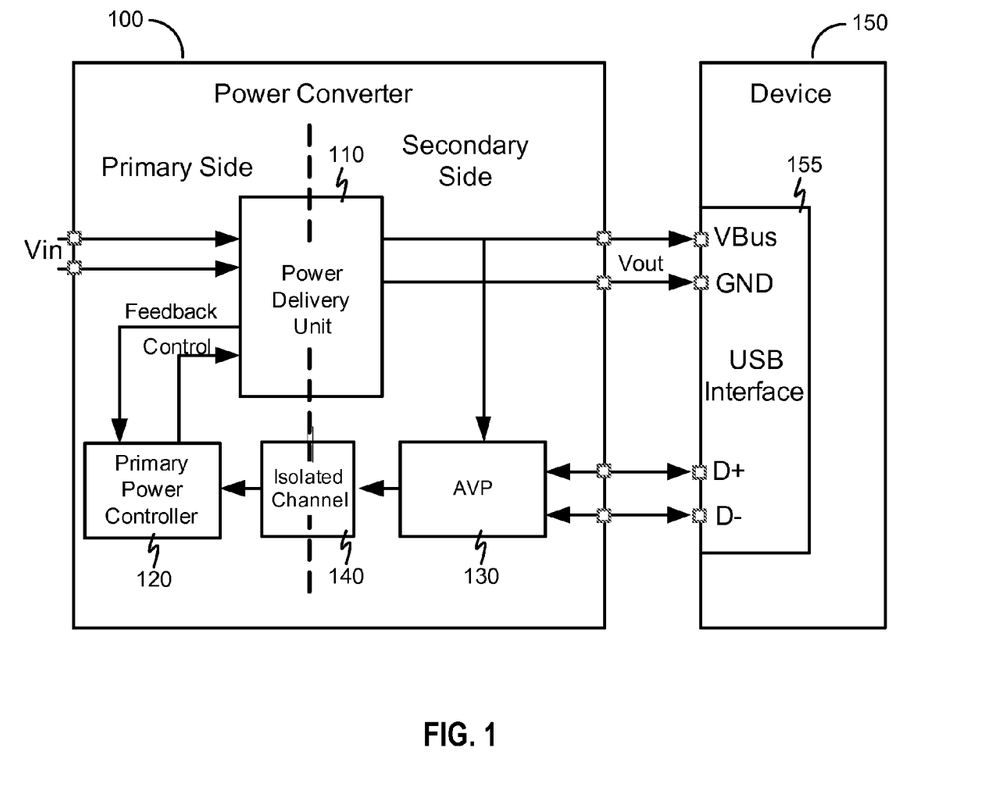
FIG. 1 illustrates an isolated switching power converter that allows information to be communicated from the secondary side to the primary side of the isolated switching power converter, according to one embodiment.

FIG. 1 illustrates a system including a switching power converter 100 and an electronic device 150 connected to an output of the switching power converter 100, according to one embodiment. In one embodiment, the switching power converter 100 comprises a power delivery unit 110, a controller 120 on a primary side of the power delivery unit 110, an adaptive voltage position (AVP) controller 130 on a secondary side of the power delivery unit 110, and an isolated channel 140 enabling communication between the secondary-side AVP controller 130 and the primary-side controller 120.

The power converter 100 receives AC power from an AC power source (not shown), which is rectified to provide the regulated DC input voltage Vin. The power delivery unit 110, comprising an isolated switching power converter such as a flyback power converter or a forward power converter, provides a regulated output voltage Vout to the electronic device 150 connected to the switching power converter 100. In one embodiment, the power delivery unit 110 delivers the output voltage Vout to VBus and GND terminals of a USB interface 155 of the electronic device 150. The primary power controller 120 controls the power delivery unit 110 to generate the regulated output voltage Vout.

The secondary-side AVP controller 130 receives information from the electronic device 150 (e.g., via differential data links D+ and D− of the USB interface 155) and communicates the information to the primary controller 120 via the isolated channel 140. In particular, the AVP controller 130 encodes the information received at the secondary side as digital logic bits of ones and zeros and sends the information to the primary controller 120 in the form of pulses. In one embodiment, the AVP controller 130 encodes the information using pulses of varying period, where a period of a pulse is defined as the duration of time between two rising (or falling) edges of consecutive pulses. For example, the AVP controller 130 generates a digital zero bit using a pulse with a longer period, and generates a digital one bit using a pulse with a shorter period. The AVP controller 130 may alternatively generate a digital zero bit using a pulse with a shorter period and a digital one bit using a pulse with a longer period. Pulses having different periods than the digital zero and one pulses may encode other information, such as an overvoltage condition or an undervoltage condition. The AVP controller 130 sends one or more pulses to the primary controller 120 via the isolated channel 140 to communicate information or commands received at the secondary side of the switching power converter 100 to the primary controller 120. Furthermore, a plurality of different commands may be encoded by combining one or more pulses into a data frame.

The AVP controller 130 includes a transmitter (not shown) that transmits the information or commands to the primary controller 120 via the isolated channel 140. The primary controller 120 includes a receiver (not shown) that receives the information or commands from the AVP controller 130 via the isolation channel 140. In various embodiments, the isolated channel 140 comprises an opto-coupler, a digital isolator, a capacitor, or another device that electrically isolates the primary side of the power delivery unit 110 from the secondary side while providing a means of communication information from the secondary side to the primary side of the power delivery unit 110.

The AVP controller 130 uses a communication protocol to exchange a variety of types of information from the secondary side of the switching power converter 100 to the primary controller 120, including output voltage regulation requests, overvoltage conditions, output undershoot (undervoltage) conditions, over temperature protection, output overshoot, constant current limit, cable drop compensation information, brown-out protection level, system shutdown timer length, or other information for configuration of the power converter 100. The AVP controller 130 digitally encodes some types of information in data frames including pulses corresponding to logic ones and zeros. Other types of information are encoded by designated signals generated by the AVP controller 130. Example signals generated by the AVP controller 130 to communicate information to the primary controller 120 are described with respect to FIGS. 3A-8.

Figure 2:
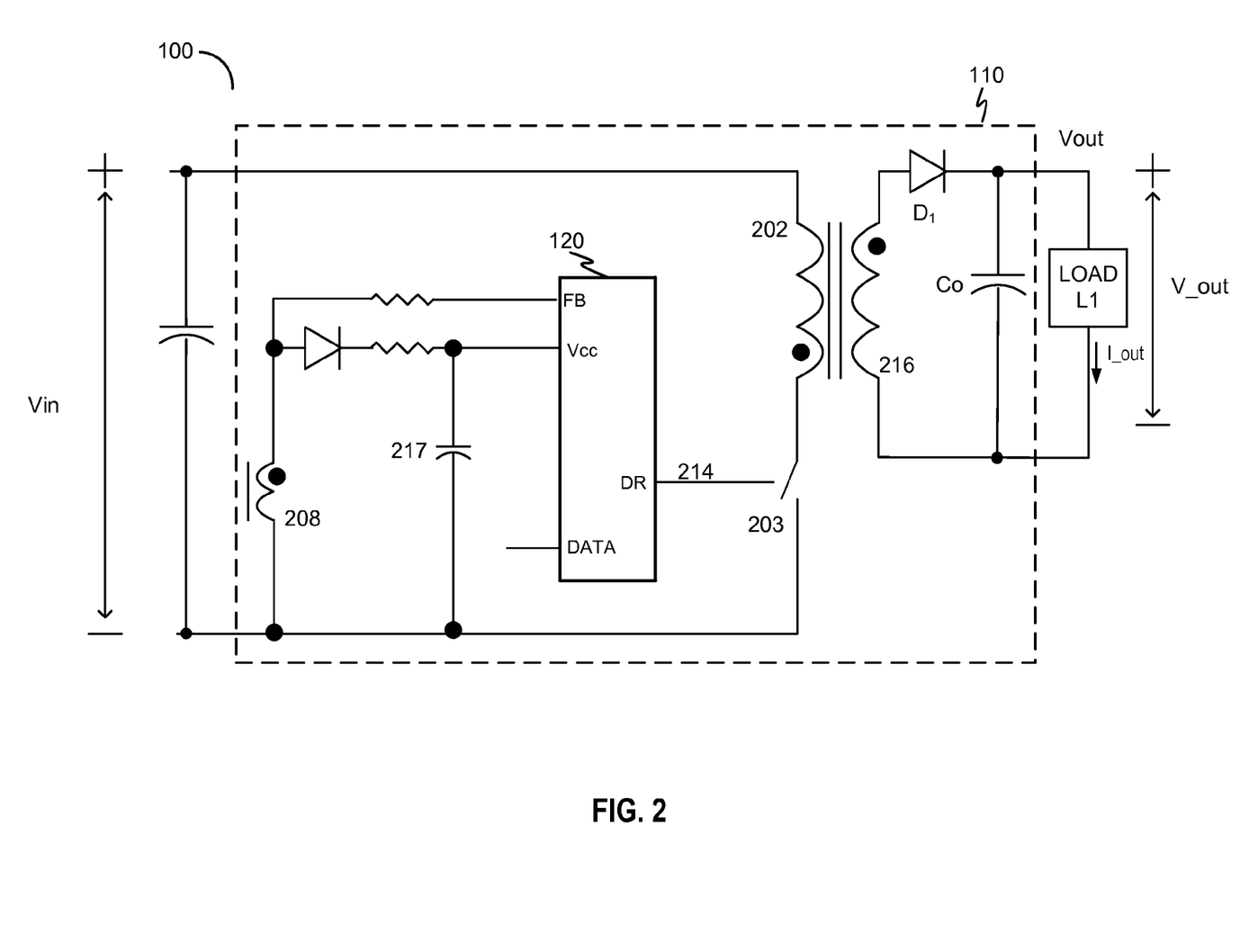
FIG. 2 illustrates a power delivery unit of a switching power converter, according to one embodiment.

FIG. 2 illustrates an example embodiment of a power delivery unit 110 of the switching power converter 100. The power delivery unit 110 includes, among other components, a switch 203 and a transformer with primary winding 202, secondary winding 216, and auxiliary winding 208.

As shown in FIG. 2, the input voltage Vin is coupled to the primary winding 202. During ON cycles of switch 203, energy is stored in primary winding 202 because the diode $D_1$ is reverse biased. The energy stored in primary winding 202 is released to the secondary winding 216 and transferred to the load L1 (e.g., the electronic device 150) across the capacitor $C_O$ during the OFF cycles of switch 203 because the diode $D_1$ becomes forward biased. Diode $D_1$ rectifies the output voltage on the secondary winding 216 and capacitor $C_o$ filters the output voltage on the secondary winding 216 for outputting as output voltage Vout to the load L1. During off cycles of the switch 203, the output voltage Vout is reflected as feedback voltage FB across the auxiliary winding 208. In one embodiment, the auxiliary winding 208 also provides a Vcc input voltage source to the primary-side controller 120.

The primary-side controller 120 generates a control signal 214 to turn on or turn off the switch 203. The primary controller 120 regulates output voltage Vout based at least in part on the feedback voltage FB generated across the auxiliary winding 208 in each off cycles of the switch 203. The primary controller 120 can employ any one of a number of modulation techniques, such as pulse-width-modulation (PWM) or pulse-frequency-modulation (PFM), to control the ON and OFF states and duty cycles of the switch 203 based on the feedback voltage FB for regulating output voltage Vout.

The primary controller 120 includes a DATA pin configured to receive signals from the AVP controller 130 via the isolation channel 140 that encode information received at the secondary side of the power delivery unit 110. The primary controller 120 controls the output of the power delivery unit 110 (e.g., by controlling switching of the switch 203) based on the signals received from the AVP controller 130, in addition to the feedback voltage generated across the auxiliary winding 208. For example, depending on the signal received from the AVP controller 130, the primary controller 120 may increase or decrease the output voltage from the power delivery unit 110 to deliver an amount of power requested by an electronic device or set a default output voltage from the power delivery unit 110, such as 5V. The primary controller 120 then uses feedback voltage across the auxiliary winding 208 to regulate the output voltage of the power delivery unit 110 to the default voltage level or the voltage level requested by the electronic device and communicated to the primary controller by the AVP controller 130.

In one embodiment, the primary controller 120 assigns a priority to each type of signal received from the AVP controller 130. For example, the primary controller 120 assigns a high priority to data frames, a medium priority to overvoltage condition signals, and a low priority to undervoltage condition signals, ensuring that the primary controller 120 will receive an entire data frame without initiating a procedure to compensate for an overvoltage or undervoltage condition. Alternatively, the primary controller 120 may assign a higher priority to overvoltage and undervoltage signals and a lower priority to data frames, enabling the primary controller 120 to react quickly to the overvoltage or undervoltage conditions inconsistent with the specifications of the electronic device 150.

Figure 3A:
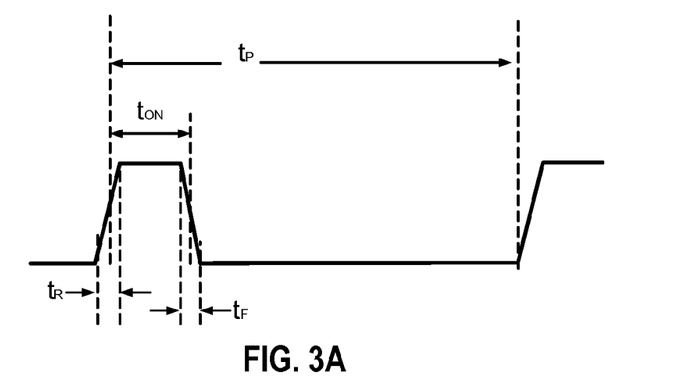
FIGS. 3A, 3B, 3C illustrate example symbols generated by a secondary-side adaptive voltage position controller, according to one embodiment.
Figure 3B:
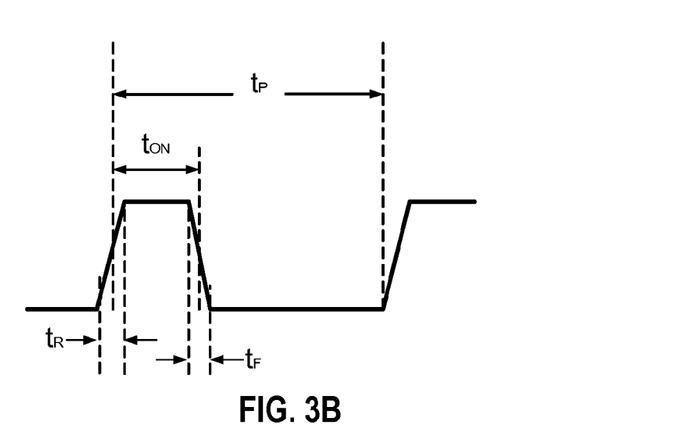
Figure 3C:
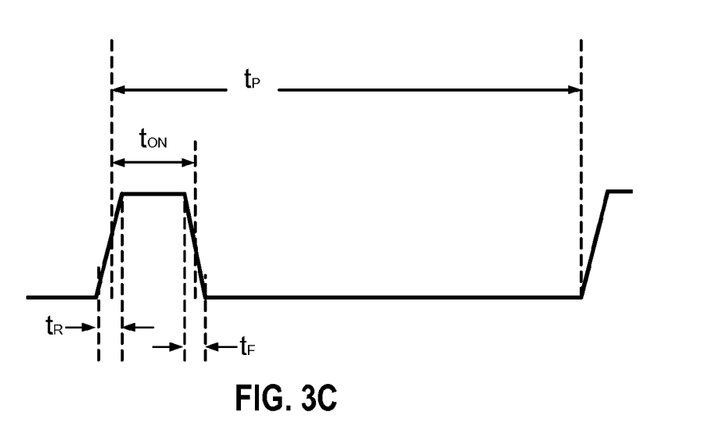

FIGS. 3A-3C illustrate example pulses generated by the AVP controller 130 to encode various symbols. The symbols shown in FIGS. 3A-3C form basic building blocks for communication between the AVP controller 130 and the primary controller 120. FIG. 3A is an example pulse for a digital zero bit. In FIG. 3A, $t_P$ is the period of the pulse (which is, for example, 400 µs±10%), $t_{ON}$ is a pulse width of the pulse (which is, for example, 40 µs±10%), and $t_R$ and $t_F$ are, respectively, the rise time and fall time of the pulse. In one embodiment, the primary controller 120 detects a pulse as being a logic zero based on the period of the pulse, and does not qualify the pulse width or rise time and fall time of the pulse.

FIG. 3B is an example pulse for a digital one bit. As shown in FIG. 3B, one embodiment of the AVP controller 130 generates digital one bits using a pulse with a shorter period than the period of the pulse generated for a digital zero bit. For example, the period $t_P$ of a pulse defining a digital one bit is 200 µs. Alternatively, the AVP controller 130 may generate a digital one bit using a pulse that has a longer period than the period of the pulse generated for the digital zero bit. The pulse width $t_{ON}$, rise time $t_R$, and fall time $t_F$ of the pulse generated for the digital one bit may be the same as the pulse generated for a digital zero bit, or may be different.

FIG. 3C is an example pulse for a bit indicating an end of a data frame. In one embodiment, the end of frame bit is a pulse with a period that is longer than the period for the digital one bit and the period for the digital zero bit. For example, the period $t_P$ of a pulse defining an end of frame bit is longer than 800 µs. The pulse width $t_{ON}$, rise time $t_R$, and fall time $t_F$ of the pulse generated for the end of frame bit may be the same as the pulse generated for a digital zero bit or digital one bit, or may be different.

Thus, the AVP controller 130 encodes information using pulses with varying periods, where the period is measured, for example, as a duration between rising edges of two consecutive pulses or as a duration between falling edges of two consecutive pulses. Because the period of a pulse is measured by detecting the same point in a pulse in each cycle (e.g., the rising edge or the falling edge of the pulse) without regard to the pulse width $t_{ON}$ of a pulse, detection errors introduced by the rising and falling edges of the pulse are effectively canceled out when measuring the pulse period. Accurate measurement of the pulse period is therefore easier than accurate measurement of pulse width. It is therefore easier and less expensive to implement an AVP controller 130 and primary controller 120 configured to communicate by an encoding scheme using pulses of varying period $t_P$ than pulses of varying pulse width $t_{ON}$.

Figure 4A:
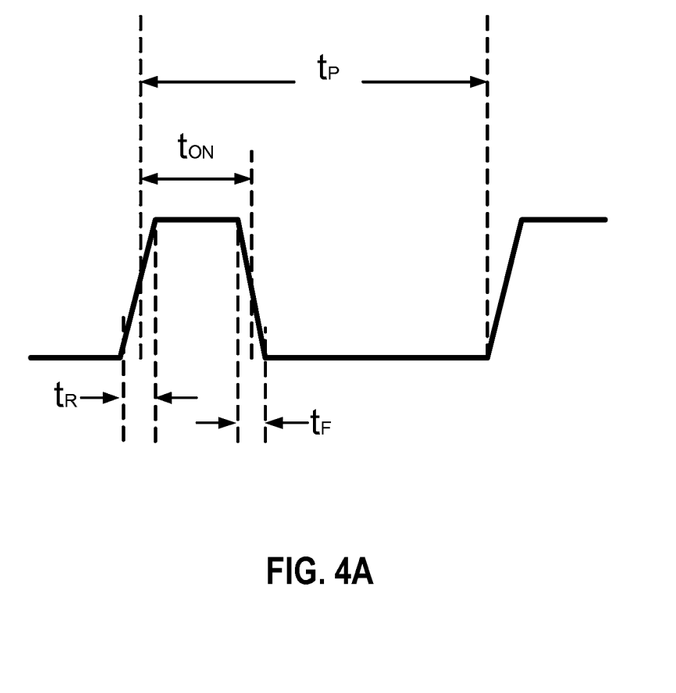
FIGS. 4A and 4B illustrate example side band symbols generated by a secondary-side adaptive voltage position controller, according to one embodiment.
Figure 4B:
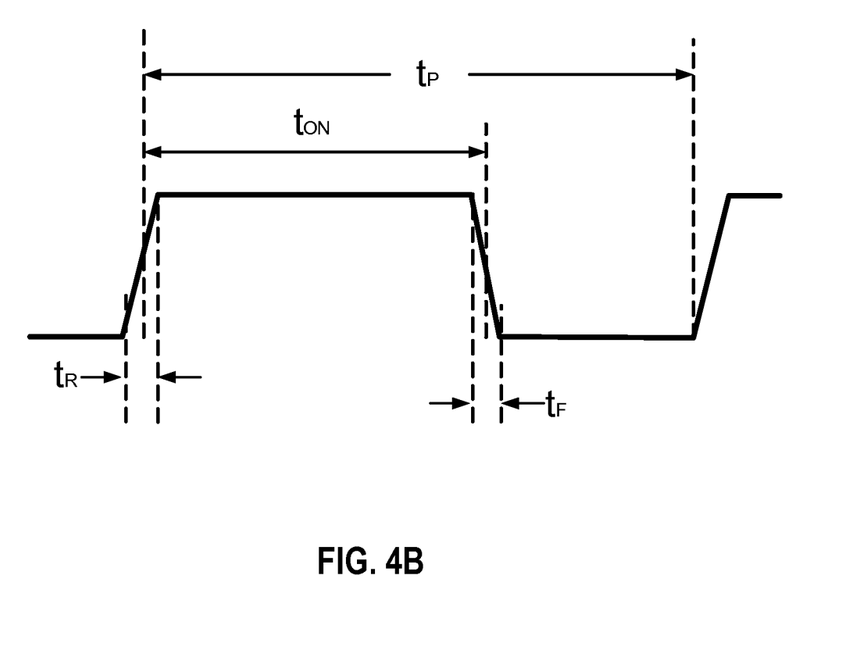

FIGS. 4A-4B illustrate example side band symbols generated by the AVP controller 130. The side band symbols are used to directly communicate information from the AVP controller 130 to the primary controller 120. For example, FIG. 4A is a pulse generated by the AVP controller 130 for notifying the primary controller 120 of overvoltage conditions. In the example of FIG. 4A, the overvoltage protection pulse is a pulse with a period (e.g., 100 µs) that is less than the period of the digital zero bit and the period of the digital one bit. As another example, FIG. 4B is a pulse generated by the AVP controller 130 for notifying the primary controller 120 of undervoltage conditions. In the example of FIG. 4B, the undervoltage pulse is a substantially constant signal generated by the AVP controller 130 when the output voltage Vout is below a specified threshold, where the pulse width $t_{ON}$ may be any portion of the period $t_P$ of the pulse. Alternatively, the AVP controller 130 may encode the undervoltage signal as a pulse with a period $t_P$ of a specified length that is different from the period of the pulses encoding a logic zero, a logic one, an end of frame, and an overvoltage condition. When the primary controller 120 receives the signal encoding the notification of an overvoltage or undervoltage condition, the primary controller 120 takes an action to correct the output voltage of the power delivery unit 110 and return the output voltage within a range consistent with the specifications of the electronic device 150, where the primary controller 120 can then regulate the output voltage based on the feedback voltage across the auxiliary winding 208.

The AVP controller 130 is configured to generate data frames each including a plurality of pulses to communicate information to the primary controller 120. In one embodiment, a data frame includes one or more pulses encoding one or more data bits (i.e., a pulse encoding a logic zero or a pulse encoding a logic one), a pulse encoding a parity bit, and a pulse encoding an end of frame bit. In one embodiment, the parity bit is a pulse encoding a logic one or a logic zero, where the value of the parity bit is determined by an XOR of the data bits in the data frame.

In one example, the AVP controller 130 uses data frames to communicate output voltage requirements of the electronic device 150 to the primary controller 120. The AVP controller 130 may communicate the output voltage to the primary controller 120 on a periodic basis (e.g., every 200 ms). The following table illustrates an example encoding scheme used by the AVP controller 130 to encode the output voltage requested by the electronic device 150 in two data bits:

| Output Voltage | Encoding |
| --- | --- |
| 5 V | 00 |
| 9 V | 01 |
| 12 V | 10 |
| 20 V | 11 |

The primary controller 120 is configured to decode data frames received from the AVP controller 130 and control the power delivery unit 110 to output the voltage specified by the data frames. The primary controller 120 then uses feedback voltage across the auxiliary winding 208 to regulate the output voltage of the power delivery unit 110 to the specified voltage level. If the primary controller 120 does not receive the specified output voltage from the AVP controller 130 within a threshold period of time (e.g., 400 ms), the primary controller 120 may cause the power delivery unit 110 to output a default voltage level (such as 5V). Furthermore, if the primary controller 120 receives an invalid data frame from the AVP controller 130 (e.g., if a pulse did not conform to the specifications for a logic zero or one, or if the parity bit was incorrect), the primary controller 120 may not change the output voltage from the power delivery unit 110.

Figure 5:
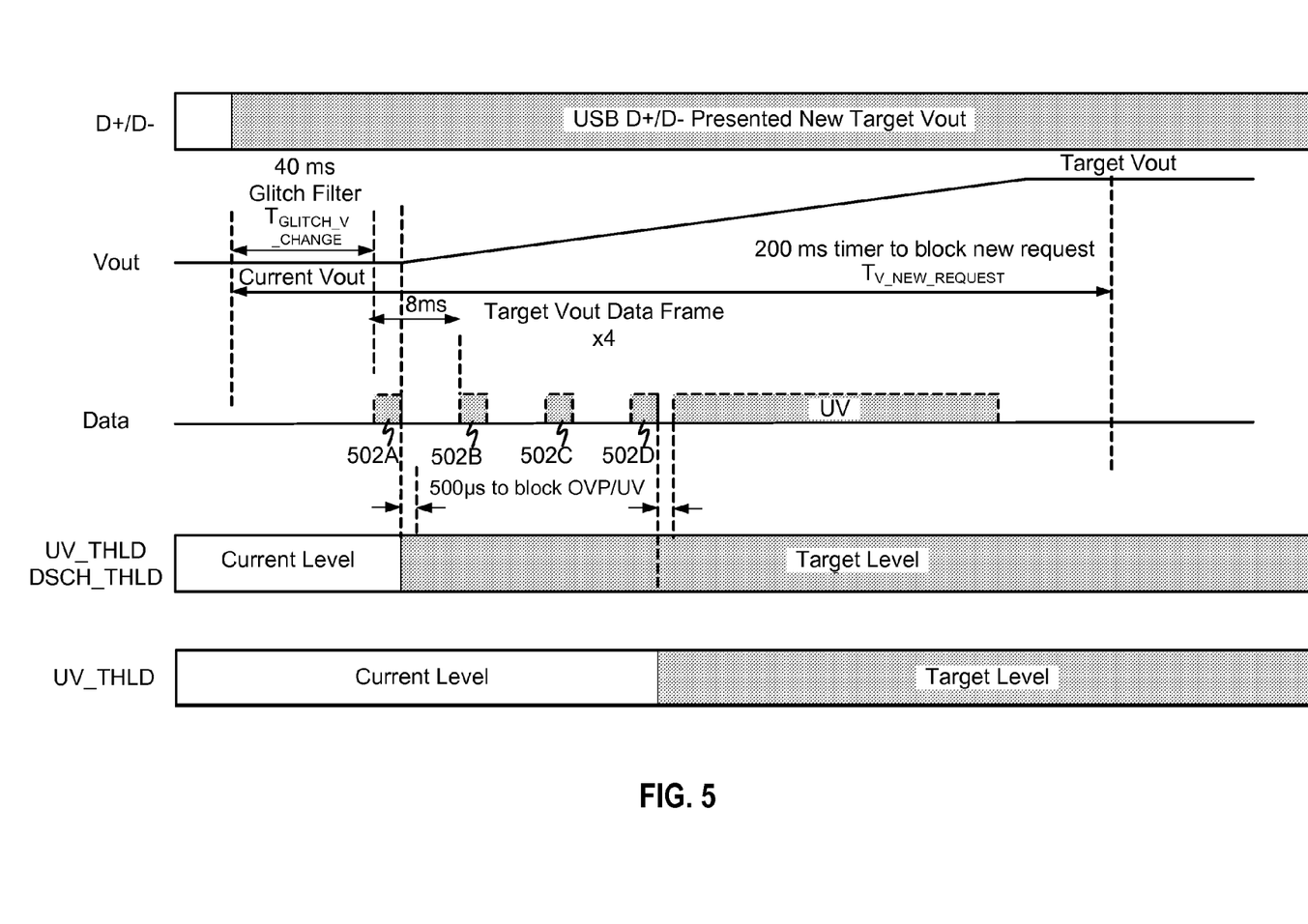
FIG. 5 illustrates a process performed by a secondary-side adaptive voltage position controller to change the output voltage of a switching power converter when an electronic device requests a higher output voltage, according to one embodiment.

FIG. 5 illustrates an example process performed by the AVP controller 130 to change the output voltage of the switching power converter 100 when the electronic device 120 requests an output voltage that is higher than the current output voltage. Illustrated in FIG. 5 are signals sent to the differential data links D+ and D− of the USB interface 155, the output voltage Vout of the power converter, a data signal (Data) generated by the AVP controller 130 and sent to the primary controller 120 via the isolated channel 140, and overvoltage threshold OVP_THLD, discharge threshold DSCH_THLD, and undervoltage threshold UV_THLD used by the AVP controller 130 to determine, respectively, overvoltage, discharge, and undervoltage conditions. Other embodiments of the AVP controller 130 may increase the voltage output of the switching power converter 100 using different procedures than those shown in FIG. 5.

As shown in FIG. 5, when indication of a new target output voltage is presented on the D+/D− links of the USB interface 155, one embodiment of the AVP controller 130 deglitches the differential data links of the USB interface 155 (e.g., for 40 ms) before transmitting a series of data frames to the primary controller 120. In one example, the AVP controller 130 transmits four data frames 502A-520D, and each data frame has a period of 8 ms. At the end of the first data frame 502A, the overvoltage and discharge thresholds OVP_THLD and DSCH_THLD used within the controller 120 are adjusted from current levels to new target levels to be thresholds for the new target output voltage. The overvoltage and undervoltage protection signals may be blocked for a period of time while the threshold is being adjusted (e.g., for 500 μs after the end of the first data frame). Similarly, at the end of the fourth data frame 502D, the undervoltage threshold UV_THLD is adjusted to be a threshold for the target output voltage, and the overvoltage and undervoltage protection signals are blocked while the threshold is being adjusted (e.g., for 500 μs after the end of the fourth data frame). The overvoltage, discharge, and undervoltage thresholds may alternatively be adjusted during or after other data frames generated by the AVP controller 130. In response to receiving the data frames 502A-520D from the AVP controller 130, the primary controller 120 increases the output voltage Vout of the switching power converter 100 to the target voltage, and regulates the output voltage to the target voltage based on feedback across the auxiliary winding 208.

Figure 6:
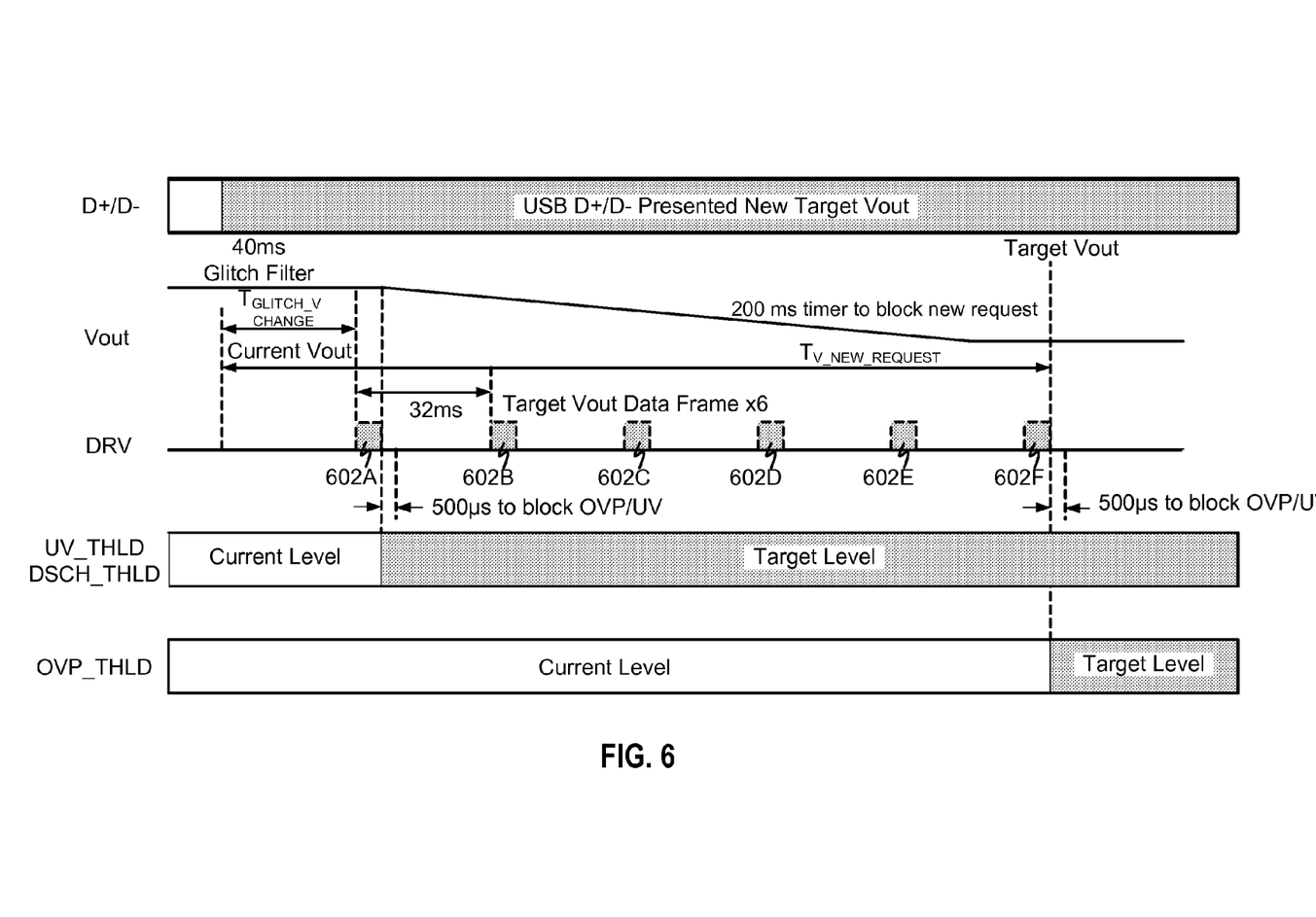
FIG. 6 illustrates a process performed by a secondary-side adaptive voltage position controller to change the output voltage of a switching power converter when an electronic device requests a lower output voltage, according to one embodiment.

FIG. 6 illustrates an example process performed by the AVP controller 130 to change the output voltage of the switching power converter 100 when the electronic device 120 requests an output voltage that is lower than the current output voltage. Illustrated in FIG. 6 are signals sent to the differential data links D+ and D− of the USB interface 155, the output voltage Vout, a data signal generated by the AVP controller 130 and sent to the primary controller 120 via the isolated channel 140, and the overvoltage threshold OVP_THLD, the discharge threshold DSCH_THLD, and the undervoltage threshold UV_THLD. Other embodiments of the AVP controller 130 may decrease the voltage output of the switching power converter 100 using different procedures than those shown in FIG. 6.

As shown in FIG. 6, when indication of a new target output voltage is presented on the D+/D− links of the USB interface 155, one embodiment of the AVP controller 130 deglitches the differential data links of the USB interface 155 (e.g., for 40 ms) before transmitting a series of data frames to the primary controller 120. In one example, the AVP controller 130 transmits six data frames 602A-602F, and each data frame has a period of 8 ms. At the end of the first data frame 602A, the overvoltage and discharge thresholds OVP_THLD and DSCH_THLD used within the controller 120 are adjusted to be thresholds for the new target output voltage. The overvoltage and undervoltage protection signals may be blocked for a period of time while the threshold is being adjusted (e.g., for 500 μs after the end of the first data frame). Similarly, at the end of the sixth data frame 602F, the undervoltage threshold UV_THLD is adjusted to be a threshold for the target output voltage, and the overvoltage and undervoltage protection signals are blocked while the threshold is being adjusted (e.g., for 500 μs after the end of the fourth data frame). The overvoltage, discharge, and undervoltage thresholds may alternatively be adjusted during or after other data frames generated by the AVP controller 130. In response to receiving the data frames 602A-602F from the AVP controller 130, the primary controller 120 decreases the output voltage of the switching power converter 100 to the new target voltage, and regulates the output voltage to the target voltage based on feedback across the auxiliary winding 208.

Figure 7A:
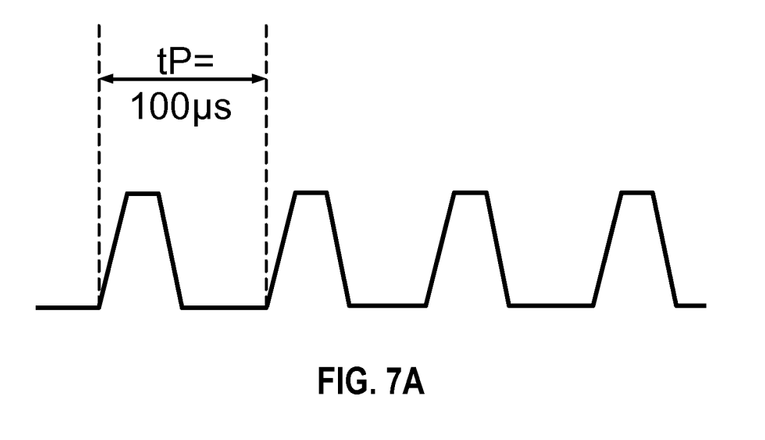
FIGS. 7A and 7B illustrate example fault protection signals generated by a secondary-side adaptive voltage position controller, according to one embodiment.
Figure 7B:
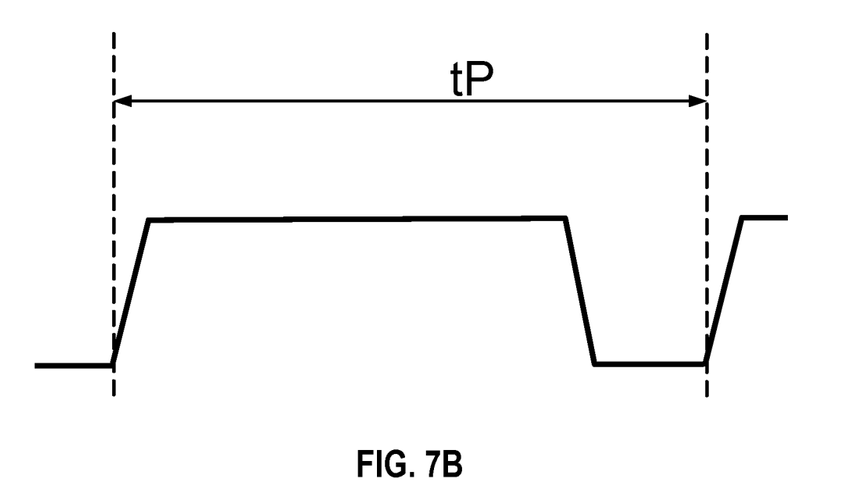

As described above, one embodiment of the AVP controller 130 is configured to communicate fault protection information to the primary controller 120. Such fault protection information includes, for example, overvoltage protection, undervoltage, channel stuck at low, and channel stuck at high. FIGS. 7A-7B illustrate example fault protection signals generated by the AVP controller 130 and sent to the primary controller 120 via the isolated channel 140.

FIG. 7A illustrates an example signal notifying the primary controller 120 of overvoltage conditions (that is, conditions in which the output voltage Vout exceeds an overvoltage threshold defined by the specifications of the electronic device 120 or the switching power converter 100). In one embodiment, as shown in FIG. 7A, the overvoltage protection signal is a series of pulses sent to the primary controller 120 each having a period of, for example, 100 µs. The overvoltage pulses may be sent asynchronously during a data frame if an overvoltage condition is detected during the data frame, invalidating the data frame. In response to detecting the overvoltage protection signal, the primary controller 120 takes measures to correct the overvoltage condition. In one embodiment, the primary controller 120 is configured to measure multiple cycles of the overvoltage protection signal (e.g., three cycles) before taking an action to correct an overvoltage condition.

FIG. 7B illustrates an example signal notifying the primary controller 120 of undervoltage conditions (that is, conditions in which the output voltage Vout is lower than the specifications of the electronic device 120). When the primary controller 120 receives the undervoltage protection signal, the primary controller 120 takes measures to correct the undervoltage condition. In one embodiment, as shown in FIG. 7B, the undervoltage protection signal is a voltage level with a finite period $t_P$. Thus, the primary controller 120 may detect every pulse received from the AVP controller 130 as an undervoltage signal and, in response to the pulse, generate a switching cycle of the power delivery unit 110 to generate feedback voltage across the auxiliary winding 208 and confirm the undervoltage condition.

The primary controller 120 may also take actions to correct a channel being stuck at a low or high voltage. In one embodiment, if the primary controller 120 receives a low signal that is longer than a threshold length, the primary controller 120 adjusts the output voltage of the switching power converter 100 to a default value (e.g., 5V). For example, the primary controller 120 adjusts the output voltage to a default value if the primary controller 120 receives a low signal for an amount of time sufficient to transmit two data frames from the AVP controller 130, where an amount of time needed to transmit a data frame is the sum of the periods $t_P$ of the pulses in the data frame. Similarly, if the primary controller 120 receives a high signal that is longer than a threshold length (e.g., two message transfer intervals), the primary controller 120 adjusts the output voltage of the switching power converter 100 to the default value. For example, the primary controller 120 adjusts the output voltage to the default value if the primary controller receives a high signal for an amount of time sufficient to transmit two data frames from the AVP controller 130 to the primary controller 120.

Figure 8:
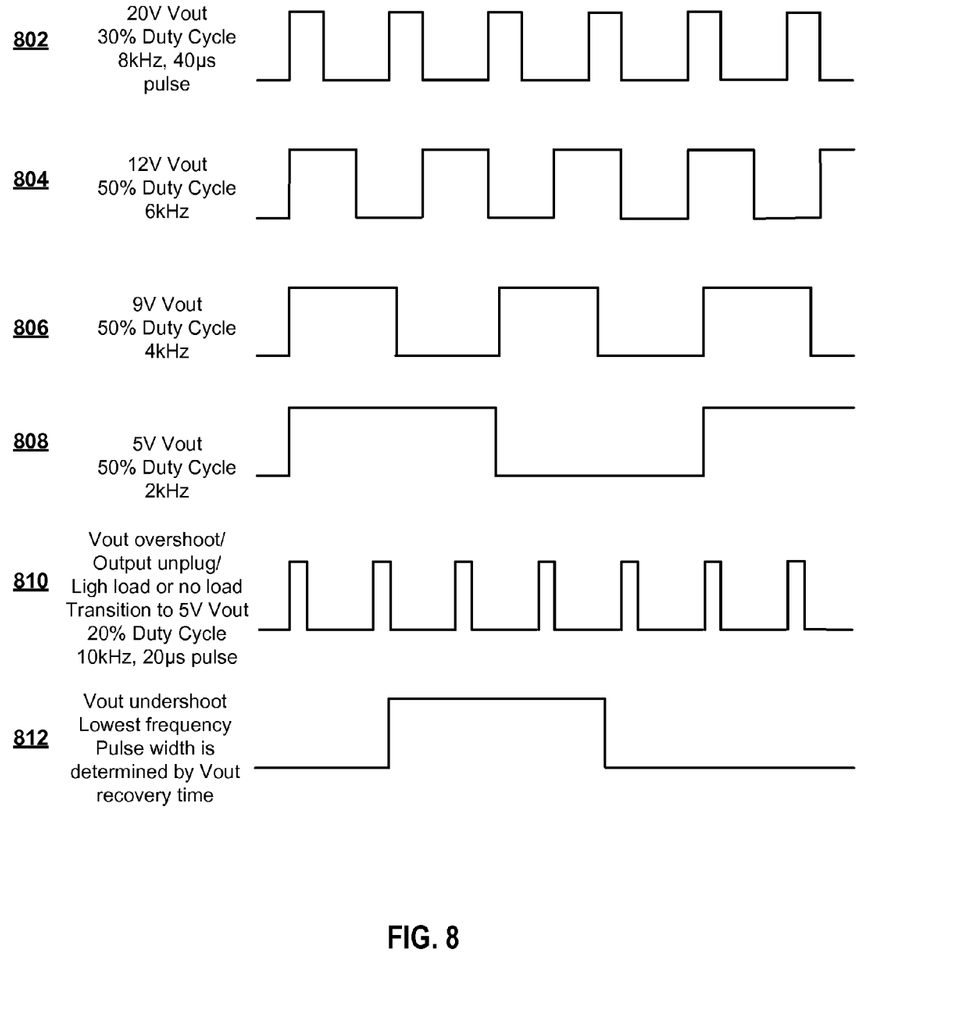
FIG. 8 illustrates example signals generated by a secondary-side adaptive voltage position controller, according to one embodiment.

As described above, the AVP controller 130 communicates a variety of different types of information to the primary controller 120 of the switching power converter 100 by encoding the information in pulses of varying length. FIG. 8 illustrates example signals generated by the AVP controller 130 to communicate information to the primary controller 120. Signal 802 is an example signal generated by the AVP controller 130 to communicate to the primary controller 120 a request from the electronic device 150 for an output voltage of 20V. The example signal 802 is an 8 kHz signal at a duty cycle of 30%, or a signal comprising pulses for which the period $t_P$ is approximately 125 µs and the pulse width $t_{ON}$ is approximately 40 µs. Signal 804 is an example signal generated to communicate requests from the electronic device 150 to the primary controller 120 for an output voltage of 12V. The example signal 804 is a 6 kHz signal at a 50% duty cycle, or a signal comprising pulses for which the period $t_P$ is approximately 167 µs and the pulse width $t_{ON}$ is approximately 80 µs. Signal 806 is an example signal generated to communicate requests from the electronic device 150 to the primary controller 120 for an output voltage of 9V, and is a 4 kHz signal at 50% duty cycle (i.e., $t_P$=250 µs and $t_{ON}$=125 µs). Signal 808 is an example signal generated to communicate requests from the electronic device 150 to the primary controller 120 for an output voltage of 5V, and is a 2 kHz signal at 50% duty cycle (i.e., $t_P$=500 µs and $t_{ON}$=250 µs). Signal 810 is an example signal communicating an overvoltage condition to the primary controller 120, including overvoltage conditions generated by the electronic device 150 being disconnected from the power converter 100 or a light- or no-load condition. The example signal 810 is a 10 kHz signal at 20% duty cycle, or a signal comprising pulses for which the period $t_P$ is approximately 100 µs and the pulse width $t_{ON}$ is approximately 20 µs. Signal 812 is an example signal communicating an undervoltage condition to the primary controller 120, and is a low frequency signal (e.g., less than 2 kHz). Other embodiments of the AVP controller 130 may generate different signals to communicate information to the primary controller 120 than those illustrated in FIG. 8. For example, the AVP controller 130 may encode output voltage requested by the electronic device 150 in two bits of data that are sent to the primary controller 120 in a data frame including the two data bits, a parity bit, and an end of frame bit. Alternatively, the AVP controller 130 may encode output voltage using pulses of different periods than those shown in FIG. 8. The AVP controller 130 may also communicate additional, fewer, or different types of information than those illustrated in FIG. 8.

Accordingly, a switching power converter 100 according to various embodiments receives information on a secondary side of the switching power converter 100 and encodes the information using pulses of varying period for communication to the primary side, where the information can be used to control the output of the switching power converter 100. The switching power converter 100 can therefore be used to power electronic devices requiring a variety of output voltages, and can quickly respond to other requests communicated to the switching power converter 100 by the electronic device 150. Furthermore, as detection errors introduced by rising and falling edges of pulses are canceled out when measuring pulse period, the AVP controller 130 and primary controller 120 configured to communicate using pulses of varying period are simpler and less expensive than controllers communicating by other encoding schemes.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A power converter system, comprising:
   a switching power converter having a primary side and a secondary side that are electrically isolated from each other;
   a first controller on the primary side of the switching power converter, the first controller controlling a switch coupled to a primary winding on the primary side in the switching power converter on or off at a switching frequency of the switching power converter to regulate an output voltage of the switching power converter;
   a second controller on the secondary side of the switching power converter, the second controller encoding information into one or more pulses such that a first duration between consecutive ones of the pulses corresponds to a first logic level and a second duration between consecutive ones of the pulses corresponds to a second logic level, the second duration being greater than the first duration; and
   a communication channel for transmitting the encoded information from the second controller to the first controller while maintaining electrical isolation between the primary side and the secondary side,
   the first controller further generating a control signal to turn on or off the switch to regulate the output voltage, based on the encoded information and a feedback voltage across an auxiliary winding coupled to the primary winding.

2. The power converter system of claim 1, wherein the first duration and the second duration are durations between rising edges of two consecutive pulses.

3. The power converter system of claim 1, wherein the first duration and the second duration are durations between falling edges of two consecutive pulses.

4. The power converter system of claim 1, wherein the first logic level is one and the second logic level is zero.

5. The power converter system of claim 1, wherein the second controller encodes the information into one or more pulses by generating one or more pulses having substantially equal pulse width but different durations between the pulses, wherein different information is encoded by the different durations between the pulses.

6. The power converter system of claim 1, wherein the information is provided from a load device coupled to an output of the switching power converter to the second controller via a data link of a universal serial bus (USB) interface of the load device.

7. The power converter system of claim 1, wherein the encoded information indicates the output voltage of the switching power converter exceeds an upper threshold voltage, and wherein the first controller controls the switch to reduce the output voltage of the switching power converter in response to receiving the encoded information from the second controller.

8. The power converter system of claim 1, wherein the encoded information indicates the output voltage of the switching power converter is less than a lower threshold voltage, and wherein the first controller controls the switch to increase the output voltage of the switching power converter in response to receiving the encoded information from the second controller.

9. The power converter system of claim 1, wherein the encoded information indicates a target output voltage requested by a load device coupled to an output of the switching power converter, and wherein the first controller controls the switch to output the requested target output voltage from the switching power converter.

10. The power converter system of claim 1, wherein the encoded information comprises one or more of an overshoot of an output voltage of the switching power converter, a brown-out protection level, a system shutdown timer length, a temperature of an electronic device coupled to the switching power converter, a constant current limit of the electronic device, and information for compensating for a voltage drop in a cable coupling the electronic device to the switching power converter.

11. The power converter system of claim 1, wherein the second controller encodes the information into a data frame including a plurality of pulses corresponding to one or more data bits, a parity bit, and an end of frame bit, wherein durations between two or more consecutive pulses in the data frame corresponding to the one or more data bits and the parity bit are at least one of the first duration and the second duration to encode the one or more data bits at the first logic level or the second logic level, and wherein a third duration between two or more consecutive pulses in the data frame corresponds to the end-of-frame bit.

12. The power converter system of claim 1, wherein the communication channel comprises one of an opto-coupler, a digital isolator, and a capacitor.

13. A method for communicating information from a secondary side of a switching power converter in a power converter system to a primary side of the switching power converter, the power converter system comprising a first controller on the primary side of the switching power converter, a second controller on the secondary side of the switching power converter, and a communication channel maintaining electrical isolation between the primary side and the secondary side, the method comprising:
   controlling a switch coupled to a primary winding on the primary side in the switching power converter on or off at a switching frequency of the switching power converter by the first controller to regulate an output voltage of the isolated switching power converter;
   encoding information into one or more pulses by the second controller such that a first duration between consecutive ones of the pulses corresponds to a first logic level and a second duration between consecutive ones of the pulses corresponds to a second logic level, the second duration being greater than the first duration;
   transmitting the encoded information from the second controller to the first controller via the communication channel while maintaining electrical isolation between the primary side and the secondary side; and
   generating a control signal to turn on or off the switch to regulate the output voltage, based on the encoded information and a feedback voltage across an auxiliary winding coupled to the primary winding.

14. The method of claim 13, wherein the first duration and the second duration are durations between rising edges of two consecutive pulses.

15. The method of claim 13, wherein the first duration and the second duration are durations between falling edges of two consecutive pulses.

16. The method of claim 13, wherein encoding the information into one or more pulses comprises generating one or more pulses having substantially equal pulse width and different durations between the pulses, wherein different information is encoded by the different durations between the pulses.

17. The method of claim 13, further comprising:
receiving the information at the second controller via a data link of a universal serial bus (USB) interface of a load device coupled to an output of the switching power converter.

18. The method of claim 13, wherein the encoded information indicates the output voltage of the isolated switching power converter exceeds an upper threshold voltage, and wherein controlling the switch comprises switching the switch to reduce the output voltage of the isolated switching power converter.

19. The power converter system of claim 1, wherein the encoded information indicates a target output voltage requested by a load device coupled to an output of the switching power converter, and wherein controlling the switch comprises switching the switch to output the requested target output voltage from the switching power converter.

20. The method of claim 13, wherein encoding the information into one or more pulses comprises generating a data frame including a plurality of pulses corresponding to one or more data bits, a parity bit, and an end of frame bit, wherein durations between two or more pulses in the data frame corresponding to the one or more data bits and the parity bit are at least one of the first duration and the second duration to encode the one or more data bits at the first logic level or the second logic level, and wherein a third duration between two or more pulses in the data frame corresponds to the end-of-frame bit.

* * * * *